United States Patent
Kawachiya et al.

(10) Patent No.: US 10,579,398 B2
(45) Date of Patent: *Mar. 3, 2020

(54) ACCELERATING REFERENCE COUNT PROCESSING IN OBJECT DELETION

(71) Applicant: INTERNATIONAL BUSINESS MACHINES CORPORATION, Armonk, NY (US)

(72) Inventors: Kiyokuni Kawachiya, Tokyo (JP); Mikio Takeuchi, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/807,051

(22) Filed: Nov. 8, 2017

(65) Prior Publication Data

US 2018/0239597 A1 Aug. 23, 2018

Related U.S. Application Data

(63) Continuation of application No. 15/439,381, filed on Feb. 22, 2017.

(51) Int. Cl.
*G06F 9/44* (2018.01)
*G06F 9/448* (2018.01)

(52) U.S. Cl.
CPC ................... *G06F 9/4488* (2018.02)

(58) Field of Classification Search
CPC . G06F 8/31; G06F 8/30; G06F 9/4428; G06F 8/423; G06F 9/4425
USPC ................................................. 717/114–118
See application file for complete search history.

(56) References Cited

U.S. PATENT DOCUMENTS

| 7,991,961 | B1 * | 8/2011 | Tsai ................... G06F 12/0253 711/132 |
| 8,769,212 | B2 | 7/2014 | Sheaffer et al. |
| 2007/0150509 | A1 | 6/2007 | Lev et al. |
| 2012/0254846 | A1 | 10/2012 | Moir et al. |
| 2012/0310987 | A1 | 12/2012 | Dragojevic et al. |
| 2014/0317352 | A1 | 10/2014 | Kleen |
| 2016/0364177 | A1 | 12/2016 | Anderson |

OTHER PUBLICATIONS

List of IBM Patents or Patent Applications Treated as Related dated Nov. 8, 2017, 2 pages.

* cited by examiner

*Primary Examiner* — Chuck O Kendall
(74) *Attorney, Agent, or Firm* — Tutunjian & Bitetto, P.C.; Vazken Alexanian

(57) ABSTRACT

A computer-implemented method is provided for deleting a given object from among a plurality of objects in an object-oriented programming language computing system which uses a Reference Count (RC) of each of the plurality of objects to check a liveness of the plurality of objects. The method includes decrementing, in a Reference Counts (RCs) decrement operation, RCs of objects referenced from the given object using one or more non-atomic operations in a transaction that utilizes a hardware transactional memory mechanism to accelerate the reference counts decrement operation.

12 Claims, 7 Drawing Sheets

```
Collect_Object(O) {
  for (each object P referenced from O) {
    Decrement P's RC using *atomic* operation // <- This operation is heavy
    if (the RC reached 0) call Collect_Object(P)
  }
  Free the memory area used by O
}
```

FIG. 2

```
Collect_Object(O) {
    N = the number of objects referenced from O
    if (N >= T) { // T is a threshold value decided from CPU specs, etc.
        // Proposed method
        XBEGIN // Start a transaction
        for (each object P referenced from O) {
            Decrement P's RC using *normal* operation // <- This operation is light
            if (the RC reached 0) remember P // e.g. by using bit-array
        }
        XEND // End the transaction
        if (the transaction failed) goto TRADITIONAL;
        for (each object Q whose RC reached 0) {
            call Collect_Object(Q)
        }
        Free the memory area used by O
        return;
    }
    TRADITIONAL: // Original method, for small N or transaction-failure cases
    for (each object P referenced from O) {
        Decrement P's RC *atomic* operation // <- This operation is heavy
        if (the RC reached 0) call Collect_Object(P)
    }
    Free the memory area used by O
}
```

```
Collect_Object(O) {
    N = 0; // To store the number of objects referenced from O
    for (each field in O) {
        if (the field is not an object reference) { // This operation needs object-structure info
            Clear the field with zero // Additional idea
        } else if (the value of the field is not zero) N++
    }
    call Collect_Cleaned_Object(O, N)
}

// This function does not need object-structure info, and can be implemented in runtime
Collect_Cleaned_Object(O, N) { // Non-reference fields in O were cleared with zero
    if (N >= T) { // N is the number of objects referenced from O, T is a threshold
        // Proposed method
        XBEGIN // Start a transaction
        for (each non-zero field in O) {
            P = the object referenced by the field
            Decrement P's RC using *normal* operation // <- This operation is light
            if (the RC is not 0) Clear the field in O with zero // Additional idea
        }
        XEND // End the transaction
        if (the transaction failed) goto TRADITIONAL;
        for (each non-zero field in O) {
            Q = the object referenced by the field
            call Collect_Object(Q)
        }
        Free the memory area used by O
        return;
    }
}
```

400 ◀

430A ◀

451 ◀

430B ◀

FIG. 4

ACCELERATING REFERENCE COUNT PROCESSING IN OBJECT DELETION

BACKGROUND

Technical Field

The present invention relates generally to garbage collection and, in particular, to accelerating reference count processing in object deletion.

Description of the Related Art

Many object-oriented programming language systems adopt a "Reference-Counting GC" method to collect objects which are not referenced from anywhere. In this method, each object has a "Reference Count (RC)", which is incremented when the object is newly referenced, and decremented when the reference is removed. When the RC reaches zero by the decrement, the object is collected.

The Reference-Counting GC has various merits such as the application is not stopped by garbage collection and garbage objects can be collected without delay, but the RC must be updated every time when the reference is added or removed. To support multi-threaded execution, this RC-update must be performed using atomic operations, which is very costly. For example, an object-oriented program which manipulates LinkedList continuously consumes more than 90% of its execution time to update the RCs.

Thus, there is a need for a mechanism to accelerate reference count processing.

SUMMARY

According to an aspect of the present invention, a computer-implemented method is provided for deleting a given object from among a plurality of objects in an object-oriented programming language computing system which uses a Reference Count (RC) of each of the plurality of objects to check a liveness of the plurality of objects. The method includes decrementing, in a Reference Counts (RCs) decrement operation, RCs of objects referenced from the given object using one or more non-atomic operations in a transaction that utilizes a hardware transactional memory mechanism to accelerate the reference counts decrement operation.

According to another aspect of the present invention, a computer program product is provided for deleting a given object from among a plurality of objects in an object-oriented programming language computer which uses a Reference Count (RC) of each of the plurality of objects to check a liveness of the plurality of objects. The computer program product includes a non-transitory computer readable storage medium having program instructions embodied therewith. The program instructions are executable by the computer to cause the computer to perform a method. The method includes decrementing, in a Reference Counts (RCs) decrement operation, RCs of objects referenced from the given object using one or more non-atomic operations in a transaction that utilizes a hardware transactional memory mechanism to accelerate the reference counts decrement operation.

According to yet another aspect of the present invention, a computer system is provided which uses an object-oriented, a programming-language which, in turn, uses a Reference Count (RC) of each of a plurality of objects to check a liveness of the plurality of objects. The computer system includes a processor configured to delete a given object from among the plurality of objects by decrementing, in a Reference Counts (RCs) decrement operation performed by the processor, the RCs of objects referenced from the given object using one or more non-atomic operations in a transaction that utilizes a hardware transactional memory mechanism to accelerate the reference counts decrement operation.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 2 shows exemplary pseudocode to which the present invention can be applied, in accordance with an embodiment of the present invention;

FIG. 3 shows exemplary pseudocode for accelerated reference count processing in object deletion (garbage collection), in accordance with an embodiment of the present invention;

FIGS. 4-5 show another exemplary pseudocode for accelerated reference count processing in object deletion (garbage collection), in accordance with an embodiment of the present invention.

DETAILED DESCRIPTION

The present invention is directed to accelerating reference count processing in object deletion.

Advantageously, the present invention reduces the RC-update overhead using a special technique applicable to a programming-language runtime.

In an embodiment, RC-decrements are additionally performed when an object is being collected, using hardware transactional memory (HTM).

For example, when an object is being collected (deleted), RCs of objects referenced from the object must be decremented. These multiple RC-decrements are performed using a hardware transactional memory mechanism provided by a CPU, instead of using atomic operations. However, for decrementing only one RC, an atomic operation may be faster than using the HTM. Therefore, the aforementioned approach is only used for the case where a large enough number of RCs will be decremented. It is to be appreciated that the preceding approach can be implemented in a programming language runtime and does not need complex code analysis or compiler support, so it is widely applicable.

Figure 1:
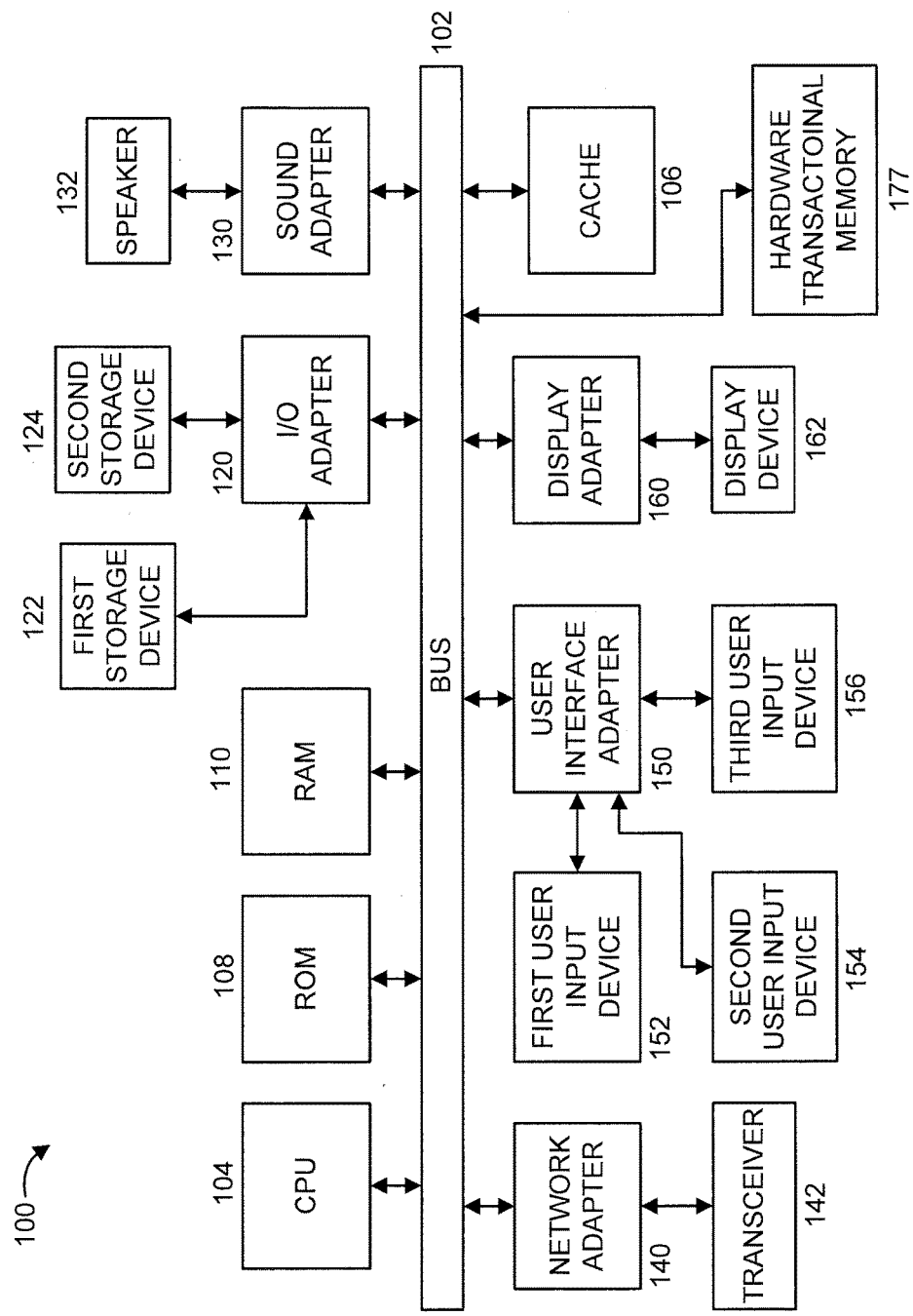
FIG. 1 shows an exemplary processing system to which the invention principles may be applied, in accordance with an embodiment of the present invention.

FIG. 1 shows an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

A hardware transactional memory (HTM) 177 is operatively coupled to other components via the system bus 102. While the HTM 177 is shown separate from CPU 104, HTM 177 may involve CPU 104 or its own processor, as readily appreciated by one of ordinary skill in the art.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 5:
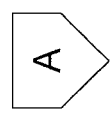
Figure 6:
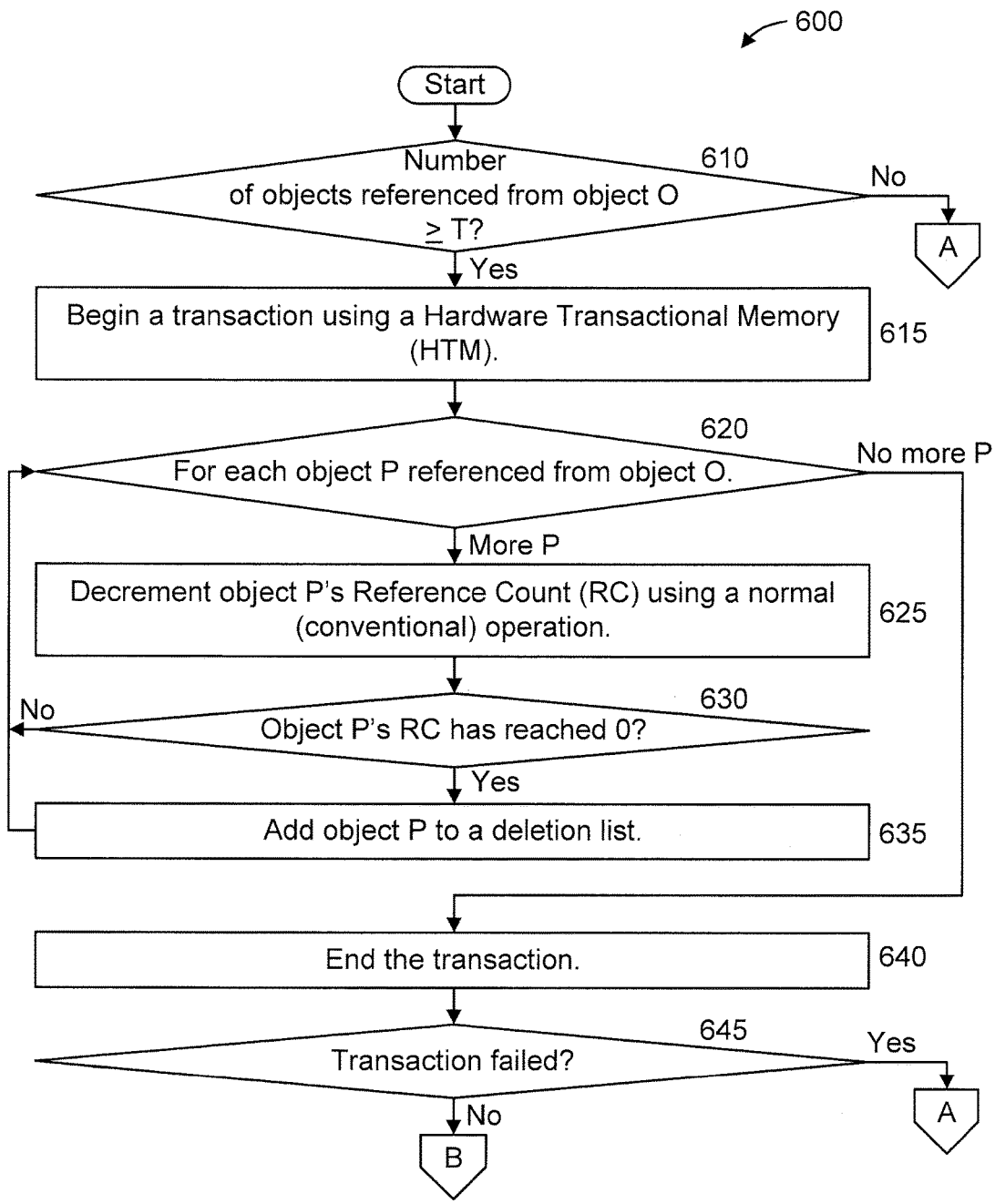
FIGS. 6-7 show an exemplary method for accelerated reference count processing in object deletion, in accordance with an embodiment of the present invention.
Figure 7:
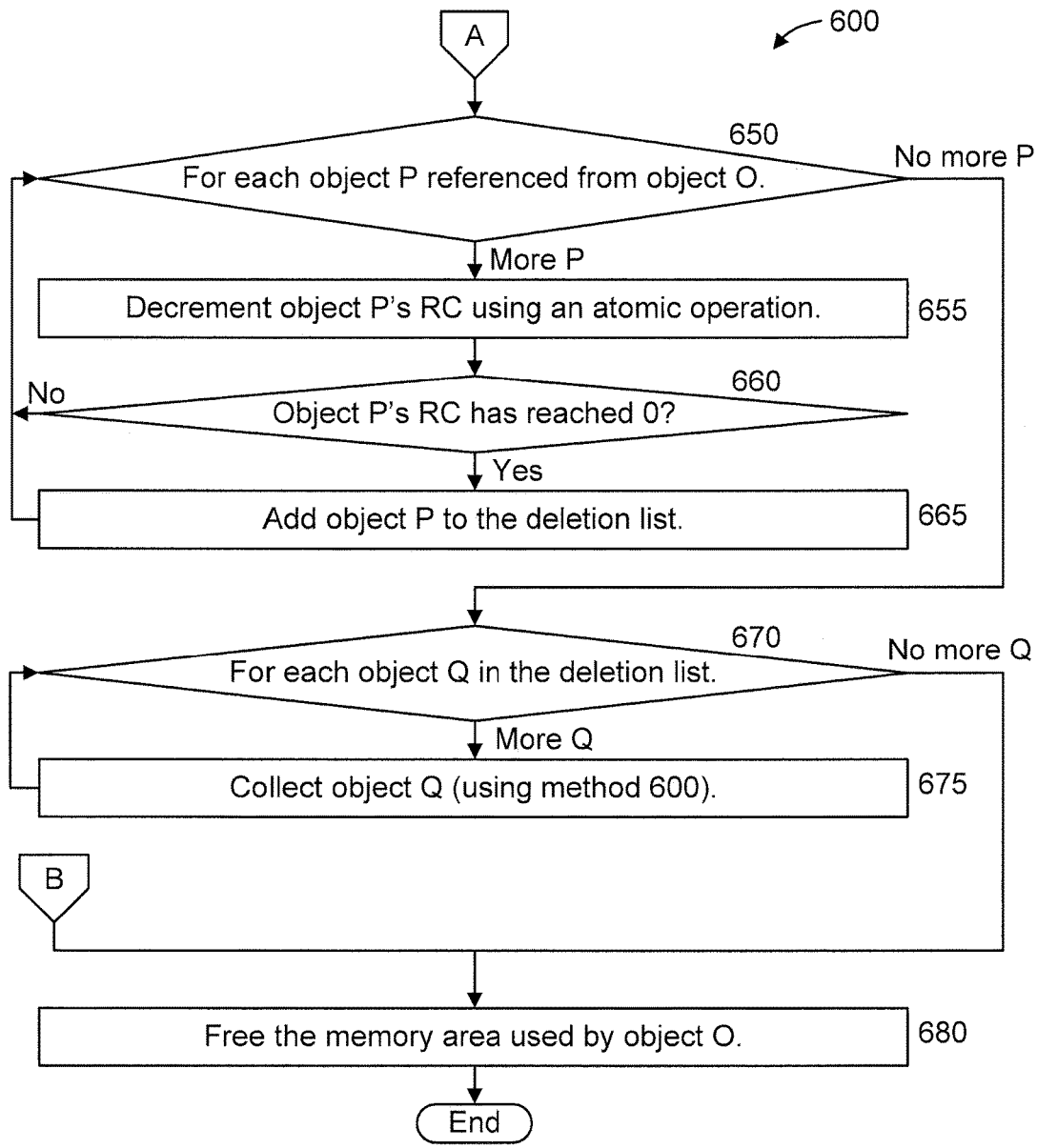

Moreover, it is to be appreciated that processing system 100 may perform at least part of the methods described herein including, for example, at least part of the method represented by the pseudocode 300 of FIG. 3, at least part of the method represented by the pseudocode 400 of FIGS. 4-5, and at least part of method 600 of FIGS. 6-7.

FIG. 2 shows exemplary pseudocode 200 to which the present invention can be applied, in accordance with an embodiment of the present invention. The pseudocode 200 is directed to solely using atomic operations for reference count processing in object deletion.

FIG. 3 shows exemplary pseudocode 300 for accelerated reference count processing in object deletion (garbage collection), in accordance with an embodiment of the present invention. In the pseudocode 300, an HTM-based approach 351 is used when the number of RCs to be decremented is larger than or equal to a threshold T. Otherwise, an atomic operation based approach 352 is used when the number of RCs to be decremented is less than the threshold T.

With respect to location 310 in the pseudocode 300, relating to a first extension, the value of the threshold T can be determined dynamically, by measuring actual performance while the language system is initialized.

With respect to location 320 in the pseudocode 300, relating to a second extension, if N is very large (like in the case when object O is a large object array), divide the RC-decrements into multiple transactions to avoid a transaction failure due to cache overflow.

With respect to location 330 in the pseudocode 300, relating to a third extension, use object O's memory area to remember object P, by which no additional memory is necessary.

FIGS. 4-5 show another exemplary pseudocode 400 for accelerated reference count processing in object deletion (garbage collection), in accordance with an embodiment of the present invention. The pseudocode 400 includes a first portion 430A and a second portion 430B relating to the third extension of FIG. 3. In the pseudocode 400, an HTM-based approach 451 is used when the number of RCs to be decremented is larger than or equal to a threshold T. Otherwise, an atomic operation based approach 452 is used when the number of RCs to be decremented is less than the threshold T.

Regarding the first portion 430A relating to the third extension, remember the object references inside O, by clearing O's non-reference fields with zero. This (clearing) operation needs object-structure information, so is effective to be done in a generated code specialized to O's class.

Further regarding the second portion 430B relating to the third extension, remember the objects to be additionally collected, by clearing O's reference field when the referenced object's RC did not reach 0.

FIGS. 6-7 show an exemplary method 600 for accelerated reference count processing in object deletion, in accordance with an embodiment of the present invention. Method 600 can be performed to delete a given object O from among a set of objects in an object-oriented programming-language system which uses a Reference Count (RC) of each of the objects in the set to check a liveness of the objects in the set.

The flowchart shows steps to collect the given object O referred to above.

At step 610, determine whether the number of objects referenced from object O≥T. If so, then continue to step 615. Otherwise, proceed to step 650.

At step 615, begin a transaction using a hardware transactional memory (HTM).

At step 620, for each object P referenced from object O, proceed to step 625. Otherwise, if no more object P's exist, then proceed to step 640.

At step 625, decrement object P's Reference Count (RC) using a normal (conventional) operation.

At step 630, determine whether object P's RC has reached 0. If so, then proceed to step 635. Otherwise, return to step 620.

At step 635, add object P to a deletion list.

At step 640, end the transaction.

At step 645, determine whether the transaction has failed. If so (fail), then proceed to step 650. Otherwise (success), then proceed to step 680.

Step 650 is the entry point of the traditional method using atomic operations. At step 650, for each object P referenced from object O, proceed to step 655. Otherwise, if no more object P's exist, then proceed to step 670.

At step 655, decrement object P's RC using an atomic operation.

At step 660, determine whether object P's RC has reached 0. If so, then proceed to step 665. Otherwise, return to step 650.

At step 665, add object P to the deletion list.

At step 670, for each object Q in the deletion list, proceed to step 675. Otherwise, if no more object Q's exist, then proceed to step 680.

At step 675, collect object Q (by using method 600 shown in FIGS. 6-7). That is, object Q is collected using method 600 in the manner used to collect object O.

At step 680, free the memory area used by object O.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer program product for deleting a given object from among a plurality of objects in an object-oriented programming language computer which uses a Reference Count (RC) of each of the plurality of objects to check a liveness of the plurality of objects, the computer program product comprising a non-transitory computer readable storage medium having program instructions embodied therewith, the program instructions executable by the computer to cause the computer to perform a method comprising:

decrementing, in a Reference Counts (RCs) decrement operation, RCs of objects referenced from the given object using one or more non-atomic operations in a transaction that utilizes a hardware transactional memory mechanism as a substitute for atomic operations to accelerate the reference counts decrement operation.

2. The computer program product of claim 1, wherein said decrementing step is performed responsive to a number of the RCs of objects referenced from the given object to be decremented in the decrementing step being greater than or equal to a threshold.

3. The computer program product of claim 2, wherein the method further comprises decrementing the RCs of objects referenced from the given object using one or more atomic operations, responsive to the number of the RCs of objects referenced from the given object to be decremented in the decrementing step being less than the threshold.

4. The computer program product of claim 2, wherein the method further comprises determining a value for the threshold by comparing an actual performance of atomic operations and normal decrements in a transaction for various numbers of RCs while the object-oriented programming language computer is initialized.

5. The computer program product of claim 1, wherein the method further comprises dividing the step of decrementing the RCs into multiple transactions to avoid a transaction failure due to memory overflow, responsive to a number of the RCs of objects referenced from the given object to be decremented in the decrementing step being greater than a threshold.

6. The computer program product of claim 1, wherein the method further comprises remembering the RCs to be decremented in said decrementing step by clearing non-object-reference fields of the given object with a zero to avoid using additional memory for the object.

7. The computer program product of claim 1, wherein the method further comprises remembering objects to be additionally collected by clearing an object reference field of the given object with a zero to avoid using additional memory for the object, when a reference count for a referenced object in the object reference field has a non-zero value after a decrement thereof.

8. The computer program product of claim 7, wherein said clearing step is performed at runtime.

9. A computer system using an object-oriented programming-language which, in turn, uses a Reference Count (RC) of each of a plurality of objects to check a liveness of the plurality of objects, the computer system comprising:

a processor configured to delete a given object from among the plurality of objects by decrementing, in a Reference Counts (RCs) decrement operation performed by the processor, the RCs of objects referenced from the given object using one or more non-atomic operations in a transaction that utilizes a hardware transactional memory mechanism as a substitute for atomic operations to accelerate the reference counts decrement operation.

10. The computer system of claim 9, wherein the processor decrements the RCs using the hardware transaction memory mechanism responsive to a number of the RCs of objects referenced from the given object to be decremented being greater than or equal to a threshold.

11. The computer system of claim 10, wherein the processor is further configured to decrement the RCs of objects referenced from the given object using one or more atomic operations, responsive to the number of the RCs of objects referenced from the given object to be decremented being less than the threshold.

12. The computer system of claim 9, wherein the processor is further configured to divide a decrementing of the RCs into multiple transactions to avoid a transaction failure due to memory overflow, responsive to a number of the RCs of objects referenced from the given object to be decremented being greater than a threshold.

* * * * *